(12) United States Patent
Mizukura

(10) Patent No.: US 8,757,314 B2
(45) Date of Patent: Jun. 24, 2014

(54) CHAIN DRIVE FOR SADDLE-RIDE TYPE VEHICLE

(71) Applicant: Honda Motor Co., Ltd., Tokyo (JP)

(72) Inventor: Yuki Mizukura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/968,819

(22) Filed: Aug. 16, 2013

(65) Prior Publication Data

US 2014/0060952 A1 Mar. 6, 2014

(30) Foreign Application Priority Data

Aug. 29, 2012 (JP) .................................. 2012-188711
May 23, 2013 (JP) .................................. 2013-109025

(51) Int. Cl.
*B62M 7/00* (2010.01)
*F16H 7/18* (2006.01)
*B62J 13/00* (2006.01)

(52) U.S. Cl.
CPC . *F16H 7/18* (2013.01); *B62M 7/00* (2013.01); *B62J 13/00* (2013.01)
USPC .......................................... 180/231; 180/228

(58) Field of Classification Search
CPC ............ B62M 7/00; B62M 7/02; B62K 5/01; B62K 25/283; B62K 11/00; B62K 11/04; B62J 13/00; F16H 7/18

USPC ........... 180/205.6, 206.7, 217, 228, 231, 239, 180/241, 251; 474/140
See application file for complete search history.

(56) References Cited

U.S. PATENT DOCUMENTS

| 3,542,146 | A  | * | 11/1970 | Trigg et al. .................... | 180/228 |
| 4,705,494 | A  | * | 11/1987 | Gibson ......................... | 474/109 |
| 6,499,553 | B2 | * | 12/2002 | Suzuki .......................... | 180/251 |
| 7,766,115 | B2 | * | 8/2010  | Kato et al. ..................... | 180/219 |
| 7,942,227 | B2 | * | 5/2011  | Arnold .......................... | 180/231 |
| 8,550,202 | B2 | * | 10/2013 | Watanabe et al. ............. | 180/231 |
| 2006/0264284 | A1 | * | 11/2006 | Iwaki ............................ | 474/140 |
| 2008/0020878 | A1 | * | 1/2008  | Carl .............................. | 474/133 |

FOREIGN PATENT DOCUMENTS

JP        H02-97187        8/1990

* cited by examiner

*Primary Examiner* — Joseph M Rocca
*Assistant Examiner* — Daniel Yeagley
(74) *Attorney, Agent, or Firm* — Rankin, Hill & Clark LLP

(57) ABSTRACT

A chain drive is provided with an engine hanger bolt. The engine hanger bolt is located in a direction rearwardly in a vehicle-body longitudinal direction and upwardly of a drive sprocket and extends in a vehicle width direction to fix an engine block to a body frame. A guide tube is mounted coaxially with the engine hanger bolt and restricts upward displacement of a drive chain.

7 Claims, 11 Drawing Sheets

CHAIN DRIVE FOR SADDLE-RIDE TYPE VEHICLE

BACKGROUND OF THE INVENTION

1. Field of the Invention

The present invention relates to a chain drive for a saddle-ride type vehicle in which power of an engine is transmitted to a rear wheel through a drive chain.

2. Description of Related Art

In this type of saddle-ride type vehicle, it is known that the tension on a drive chain varies due to the impact when the vehicle travels on a rough road or accelerates/decelerates. Especially in saddle-ride type vehicles in which a rear wheel is supported by a body frame through a swing arm, the variations in tension of the drive chain coupled with the swing of the swing arm make the drive chain likely to move up and down largely. The large up-and-down movement of the drive chain during traveling of the vehicle makes the drive chain more likely to interfere with the surroundings.

Therefore, as a chain drive for saddle-ride type vehicles which addresses this problem, there is known a chain drive in which a guide member for restricting the movement of the drive chain is mounted to a body frame (for example, see JP-U No. H2-97187).

In the chain drive disclosed in JP-U No. H2-97187, the downwardly opening U-section guide member is fixed to the body frame above a front portion of a swing arm so as to restrict excessive upward displacement of the drive chain.

However, in the above-described chain drive, because the special U-section guide member is mounted to the body frame, the structure of the guide member is complicated and a special mounting portion designed for the guide member needs to be installed on the body frame, which is likely to cause an increase in production costs.

SUMMARY OF THE INVENTION

Accordingly, an object of the present invention is to provide a chain drive for a saddle-ride type vehicle with a simple structure capable of restricting excessive displacement of a drive chain, which allows the protection of on-vehicle equipment and lower production costs.

In order to address the above-described problem, in a chain drive for a saddle-ride type vehicle according to the present invention, the following construction is employed.

In accordance with an aspect of the invention, a chain drive for a saddle-ride type vehicle includes a drive sprocket, a swing arm, a driven sprocket, a drive chain, an engine hanger bolt, and a cylindrical guide tube. The drive sprocket is mounted to an output shaft of an engine block. The swing arm has front and rear portions, the front portion of the swing arm being swingably supported by a body frame in the vicinity of the drive sprocket, and the rear portion of the swing arm journaling a rear wheel. The driven sprocket is mounted to an axle of the rear wheel. The drive chain extends between the drive sprocket and the driven sprocket. The engine hanger bolt is located in a direction rearwardly in a vehicle-body longitudinal direction and upwardly of the drive sprocket and extends in a vehicle width direction across the drive sprocket. The engine hanger bolt fixes the engine block to the body frame. The cylindrical guide tube is mounted coaxially with the engine hanger bolt. The guide tube restricts displacement of the drive chain toward on-vehicle equipment located above the drive chain.

Since the cylindrical guide is mounted coaxially with the engine hanger bolt that is located in a direction rearwardly in the vehicle-body longitudinal direction and upwardly of the drive sprocket and extends in the vehicle width direction, excessive displacement of the drive chain can be restricted by the guide tube having a simple structure, and the guide tube can be easily mounted to the body frame without setting a special mounting portion on the body frame. Therefore, the present invention allows the protection of on-vehicle equipment and lower production costs.

In accordance with another aspect of the invention, the chain drive for the saddle-ride type vehicle further includes an auxiliary guide member at a position spaced rearwardly in the vehicle-body longitudinal direction of the guide tube. The auxiliary guide member restricts upward displacement of the drive chain. Thus, the excessive upward displacement of the drive chain can be more reliably restricted.

In further accordance with the present invention, the auxiliary guide member has a cylindrical shape and is fixed to a shaft protruding from the body frame by a retaining pin, thereby allowing lower production costs.

In further accordance with the present invention, a chain drive for a saddle-ride type vehicle includes a body frame, an air cleaner, a drive sprocket, a swing arm, a driven sprocket, a drive chain, an engine hanger bolt, a cylindrical guide tube, and an auxiliary guide member. The body frame includes a head pipe; a main frame pipe extending rearward from the head pipe; left and right center pipes extending downward from a rear portion of the main frame pipe; left and right seat rails extending rearward from a rear portion of the main frame pipe; and left and right support pipes each coupling together a lower area of the center pipes and a rear area of the seat rails. The air cleaner is installed in a space surrounded by the center pipes, the seat rails, and the support pipes in side view. The air cleaner filters air drawn into an engine. The drive sprocket is mounted to an output shaft of an engine block. The swing arm has front and rear portions, the front portion of the swing arm being disposed between the left and right center pipes and swingably supported by the left and right center pipes, and the rear portion of the swing arm journaling a rear wheel. The driven sprocket is mounted to an axle of the rear wheel. The drive chain extends between the drive sprocket and the driven sprocket. The drive chain has a front portion that is disposed between the left and right center pipes along with the swing arm. The engine hanger bolt is located in a direction rearwardly in a vehicle-body longitudinal direction and upwardly of the drive sprocket and extends in a vehicle width direction across the drive sprocket. The engine hanger bolt fixes the engine block to the left and right center pipes. The cylindrical guide tube is located between one of the left and right center pipes and the engine block and mounted coaxially with the engine hanger bolt. The guide tube restricts displacement of the drive chain toward the air cleaner. The auxiliary guide member is mounted to a shaft. The shaft is located below the air cleaner and protrudes inwardly in the vehicle width direction from one of the left and right support pipes. The auxiliary guide member restricts displacement of the drive chain toward the air cleaner. According to this structure, excessive upward displacement of the drive chain can be restricted by the guide tube and the auxiliary guide member that are located in front and in the rear, respectively. With a simple structure easy to manufacture, therefore, the interference of the drive chain with the air cleaner can be effectively prevented.

In further accordance with the present invention, the auxiliary guide member is disposed rearwardly and upwardly relative to the guide tube. Thus, excessive displacement of the drive chain can be restricted without causing a sudden increase in swing resistance of the swing arm even when the drive chain is displaced largely upward along with the swing arm.

In further accordance with the present invention, the chain drive includes a drive sprocket guide. The drive sprocket guide has approximately the shape of an arc and is disposed forward of the drive sprocket so as to partially surround an outer surface of the drive sprocket. The guide tube is disposed on an imaginary line extending from the arc of the drive sprocket guide. Thus, the drive chain returning from the driven sprocket can be smoothly guided to the drive sprocket.

DETAILED DESCRIPTION OF THE PREFERRED EMBODIMENTS

Figure 1:
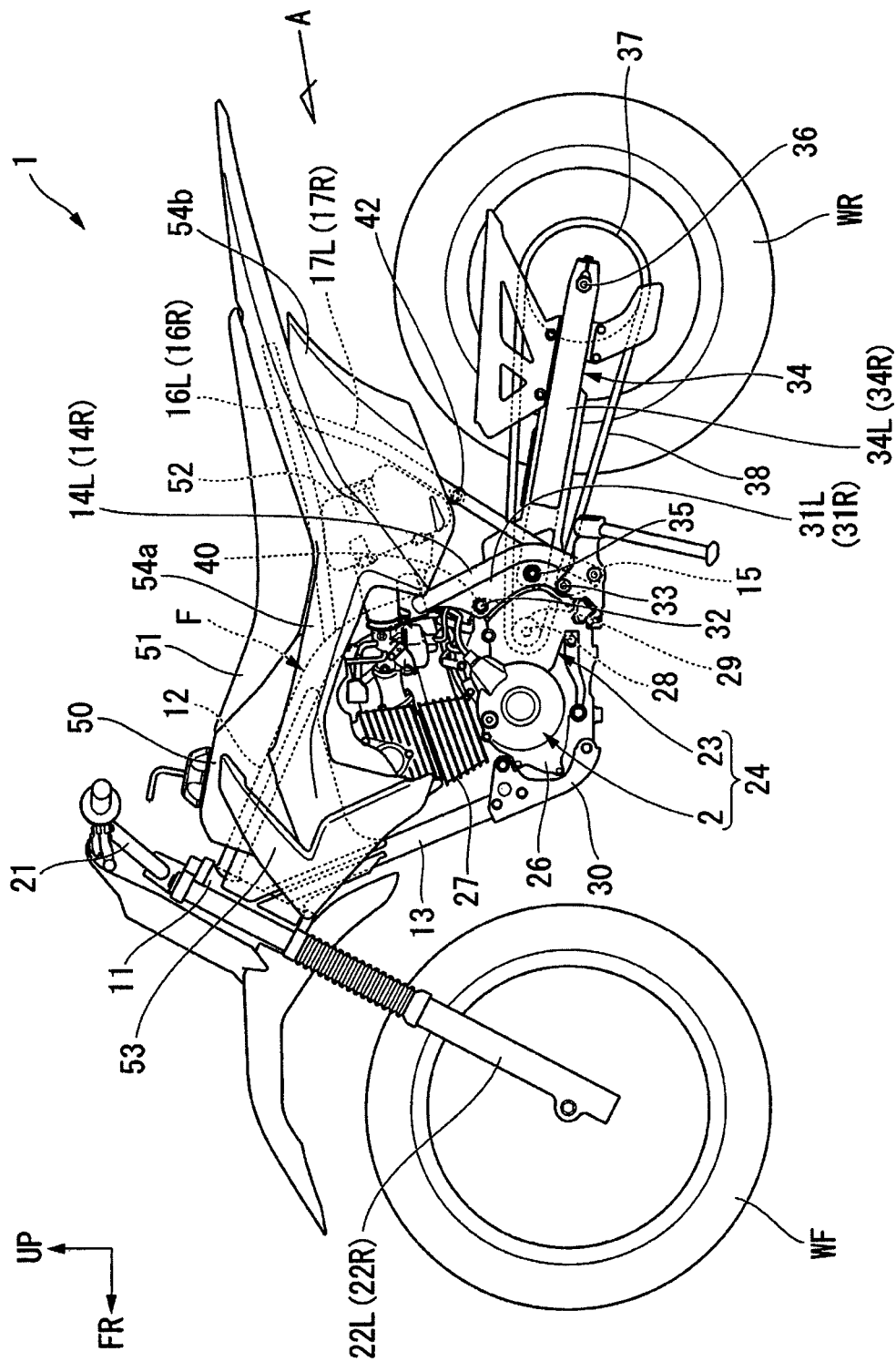
FIG. 1 is a side view of a saddle-ride type vehicle according to an embodiment of the present invention.

Hereinafter, an embodiment of the present invention will be described with reference to the accompanying drawings. It is to be noted that references to directions, such as front, rear, left, and right, in the following description are made with reference to a vehicle, unless otherwise stated. It is also to be noted that, in the drawings, arrow FR indicates the front of the vehicle, arrow UP indicates the upper side of the vehicle, and arrow LH indicates the left of the vehicle.

Figure 2:
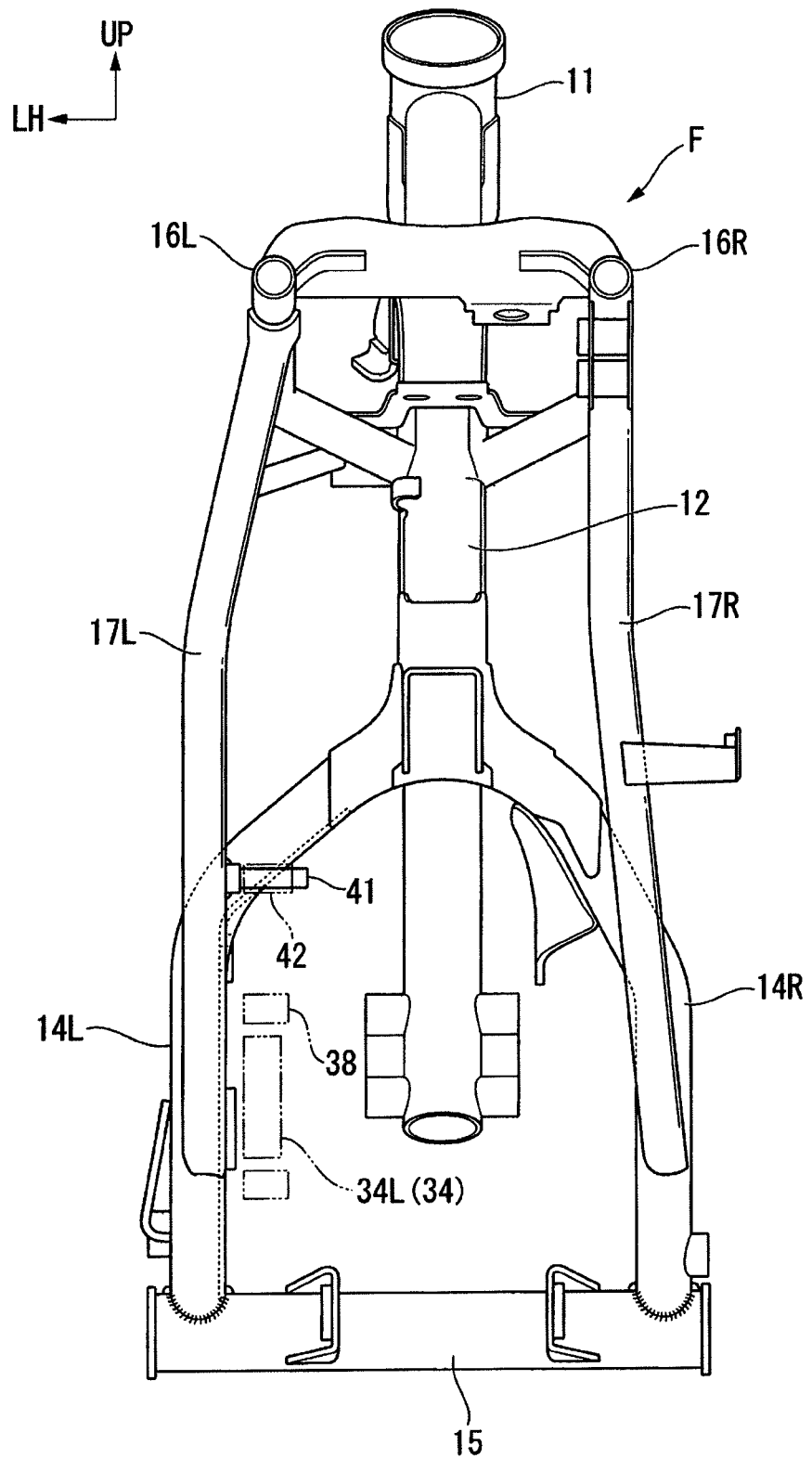
FIG. 2 is a view of a frame member of the saddle-ride type vehicle according to an embodiment of the present invention, viewed in the direction of the arrow A in FIG. 1.

FIG. 1 is a general side view of a saddle-ride type vehicle according to this embodiment, and FIG. 2 is a view of a body frame F of the saddle-ride type vehicle, viewed in the direction of the arrow A in FIG. 1.

The saddle-ride type vehicle according to this embodiment is an off-road motorcycle in which a rear wheel WR is driven by an engine 2. Hereinafter, the saddle-ride type vehicle according to this embodiment is referred to as "motorcycle 1".

The body frame F of the motorcycle 1 includes: a head pipe 11 that is disposed at a front end thereof; a main frame pipe 12 that extends rearward and obliquely downward from the head pipe 11; a down pipe 13 that extends downward from below a portion on the head pipe 11 where the head pipe 11 is coupled to the main frame pipe 12; and center pipes 14L and 14R that are bent to extend downward from left and right portions, respectively, of a rear area of the main frame pipe 12. Lower ends of the center pipes 14L and 14R are connected together by a cross pipe 15 extending in a vehicle width direction. The body frame F further includes: left and right seat rails 16L and 16R that each extend rearwardly of the vehicle body from a rear portion of the main frame pipe 12; and support pipes 17L and 17R that couple together lower areas of the left and right center pipes 14L and 14R which are above the cross pipe 15 and rear areas of the left and right seat rails 16L and 16R corresponding to the left and right center pipes 14L and 14R, respectively. The left and right support pipes 17L and 17R are each inclined to extend upward from its front end to its rear end, and an area surrounded by the seat rails 16L and 16R, the center pipes 14L and 14R, and the support pipes 17L and 17R is of substantially triangular shape in side view.

It should be noted that, of the above-described members, a member (for example, the center pipe 14R) on the rear side of the drawing sheet which overlaps and is concealed behind a corresponding member on the front side of the drawing sheet is shown by a parenthesized reference numeral for the convenience of illustration. In the following description, a member on the rear side of the drawing sheet which overlaps and is concealed behind a corresponding member on the front side of the drawing sheet will be similarly shown.

A steering stem (not shown) is journaled for turning movement on the head pipe 11. A steering handlebar 21 and left and right front forks 22L and 22R are connected to the steering stem. A front wheel WF is journaled for rotation on lower ends of the front forks 22L and 22R.

A fuel tank 50 is mounted on the main frame pipe 12, and a seat 51 for an occupant is mounted on the seat rails 16L and 16R at the rear of the fuel tank 50. Furthermore, an air cleaner 52 (on-vehicle equipment) for filtering air drawn into the engine 2 is disposed in a space located inwardly in the vehicle width direction of the area of substantially triangular shape in side view which is surrounded by the seat rails 16L and 16R, the center pipes 14L and 14R, and the support pipes 17L and 17R.

An engine block 24 with the engine 2 and a transmission 23 as main elements is installed in an area below the main frame pipe 12 and in between the down pipe 13 and the center pipes 14L and 14R. In the engine 2, a cylinder block 27 is integrally connected to an upper portion of a crankcase 26 that houses a crankshaft. The transmission 23 is integrally connected to a rear portion of the crankcase 26 of the engine 2 and provided with an output shaft 28 for taking out the power of the engine 2 to the outside. The output shaft 28 protrudes leftward in the vehicle width direction. A drive sprocket 29 is integrally connected to a protruding end of the output shaft 28.

It should be noted that, in FIG. 1, reference sign 53 denotes a plastic tank cover that extends from a lower edge portion of the fuel tank 50 to an upper edge portion of the engine block 24 to laterally cover the fuel tank 50, and reference signs 54a and 54b denote plastic side covers that are located at the rear of the tank cover 53 to laterally cover a lower portion of the seat including the side of the air cleaner 52.

Here, a front lower end of the engine block 24 is fastened to a lower edge portion of the down pipe 13 through a bracket 30. Also, a rear edge portion of the engine block 24 is supported through engine hanger bolts 32 and 33 by pivot plates 31L and 31R that are mounted to lower edge portions of the left and right center pipes 14L and 14R, respectively. Each of the pivot plates 31L and 31R has a base end welded to an internal surface in the vehicle width direction of the left and right center pipes 14L and 14R, and a leading end extending forward in a flange shape. Ends of the engine hanger bolts 32 and 33 are locked in upper and lower end areas, respectively, of an extension portion of each of the pivot plates 31L and 31R. Each of the engine hanger bolts 32 and 33 extends substantially parallel to the vehicle width direction and has each end passing through the pivot plates 31L and 31R, a leading end thereof having a nut (not shown) threaded thereon.

Furthermore, a pivot shaft 35 that swingably journals a front end of a swing arm 34 thereon is mounted in a vertically intermediate area of the pivot plates 31L and 31R. The pivot shaft 35 is set so that it is located in the vicinity of the rear of the output shaft 28 (drive sprocket 29) of the engine block 24 when the engine block 24 is mounted on the body frame F.

The swing arm 34 has arm portions 34L and 34R. The arm portions 34L and 34R both have a front end journaled to the pivot shaft 35 and a rear end with an axle 36 of the rear wheel WR journaled thereon. The arm portions 34L and 34R are disposed one at each side in the vehicle width direction of the rear wheel WR. A driven sprocket 37 is integrally mounted to the left in the vehicle width direction of the axle 36. A drive chain 38 for transmitting power of the engine 2 to the rear wheel WR extends between the drive sprocket 29 on the engine block 24 and the driven sprocket 37 in the rear of the swing arm 34.

It should be noted that the swing arm 34 is supported by the body frame F through a cushion unit (not shown).

Figure 3:
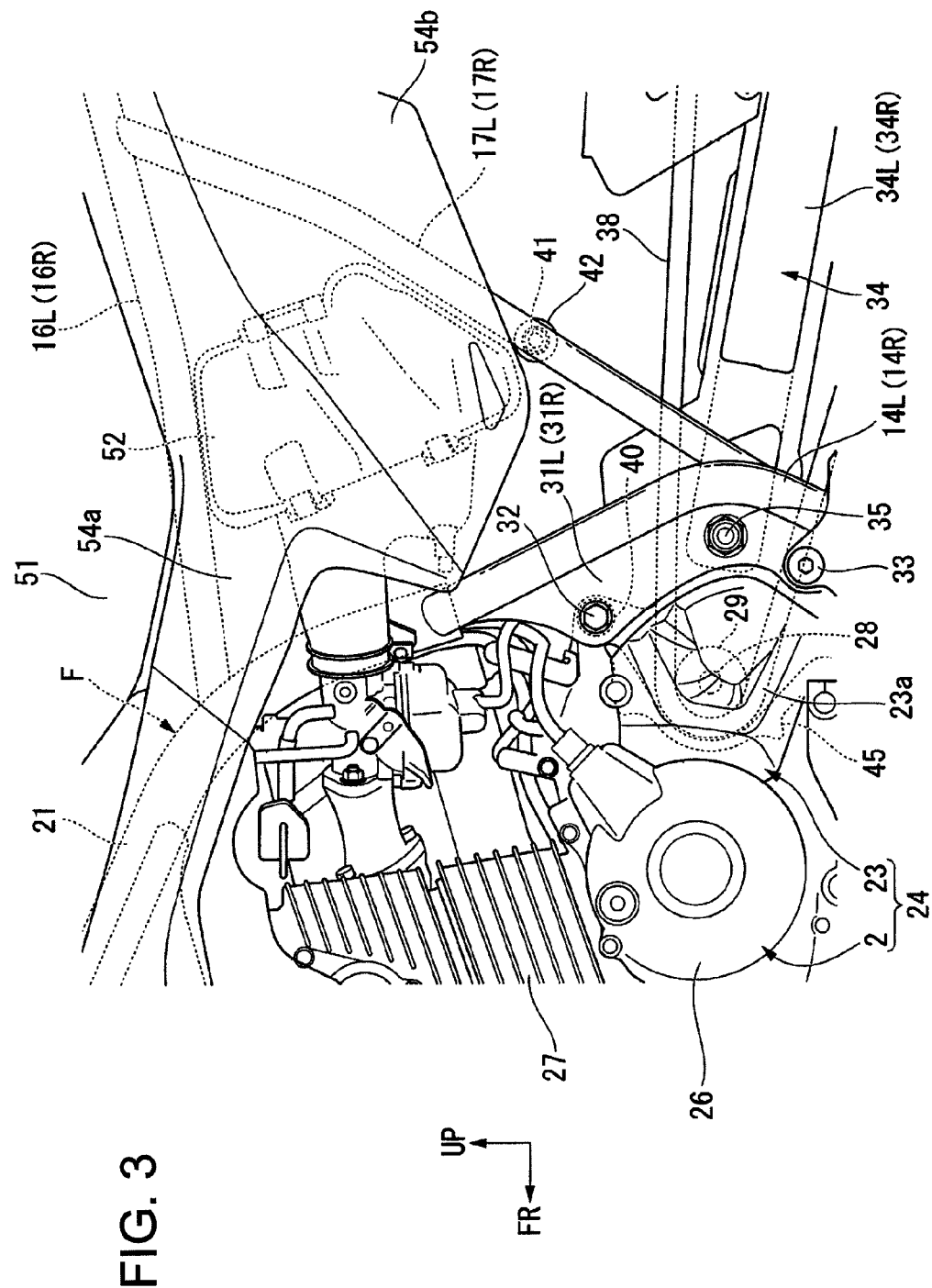
FIG. 3 is a partially enlarged view of FIG. 1.
Figure 4:
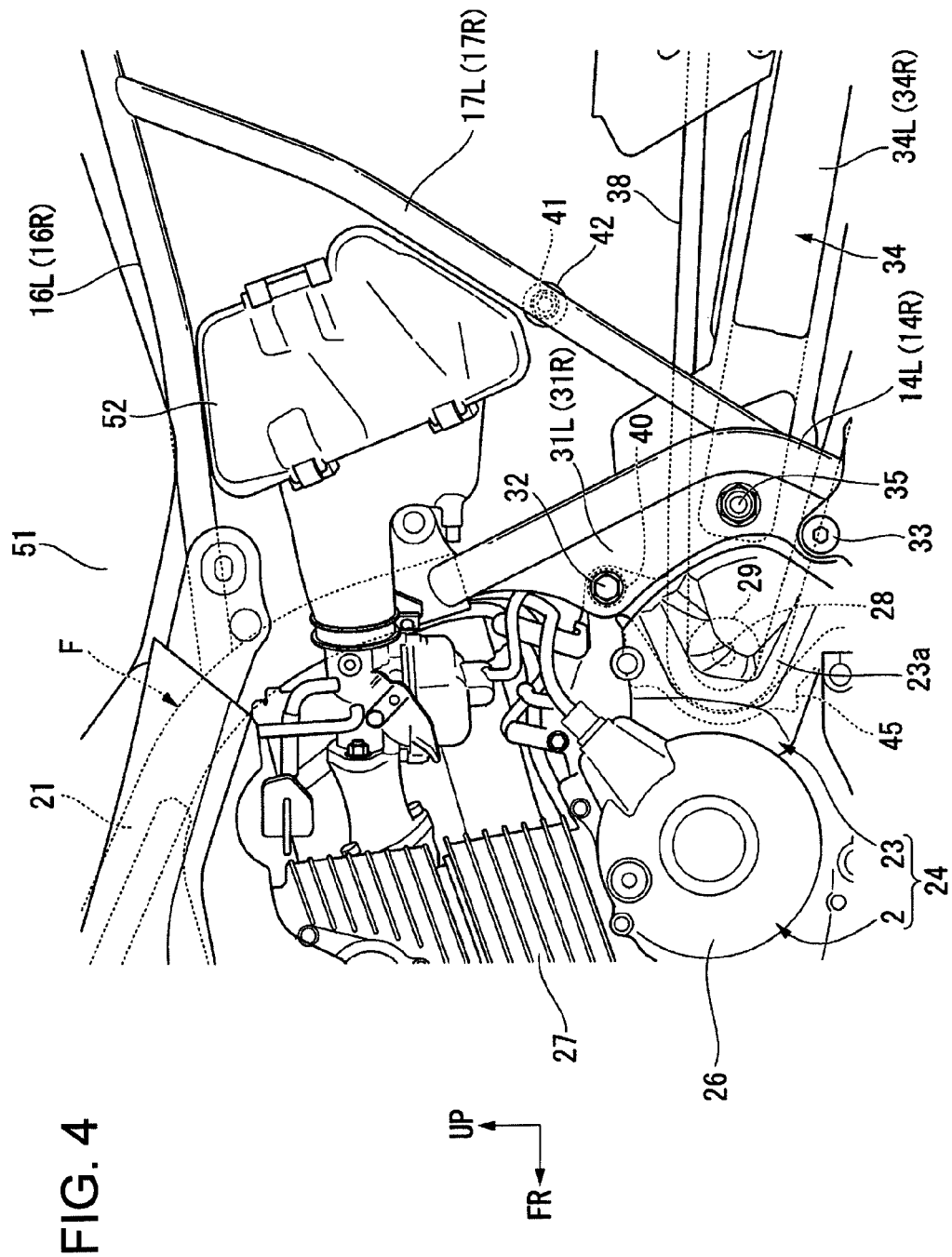
FIG. 4 is a view of FIG. 3 with side covers removed.
Figure 5:
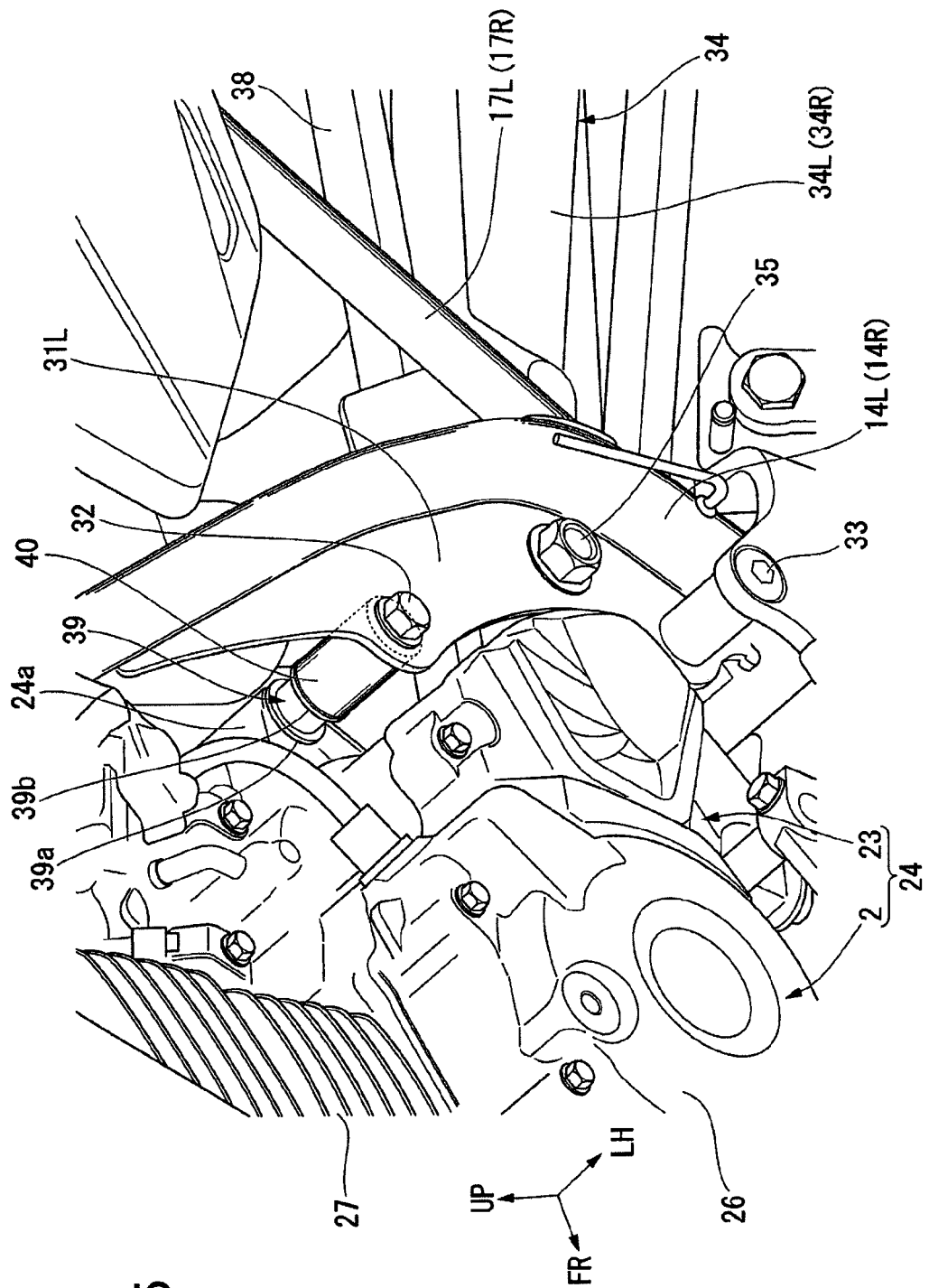
FIG. 5 is a perspective view of the same portion as in FIG. 3, viewed from obliquely upward.
Figure 6:
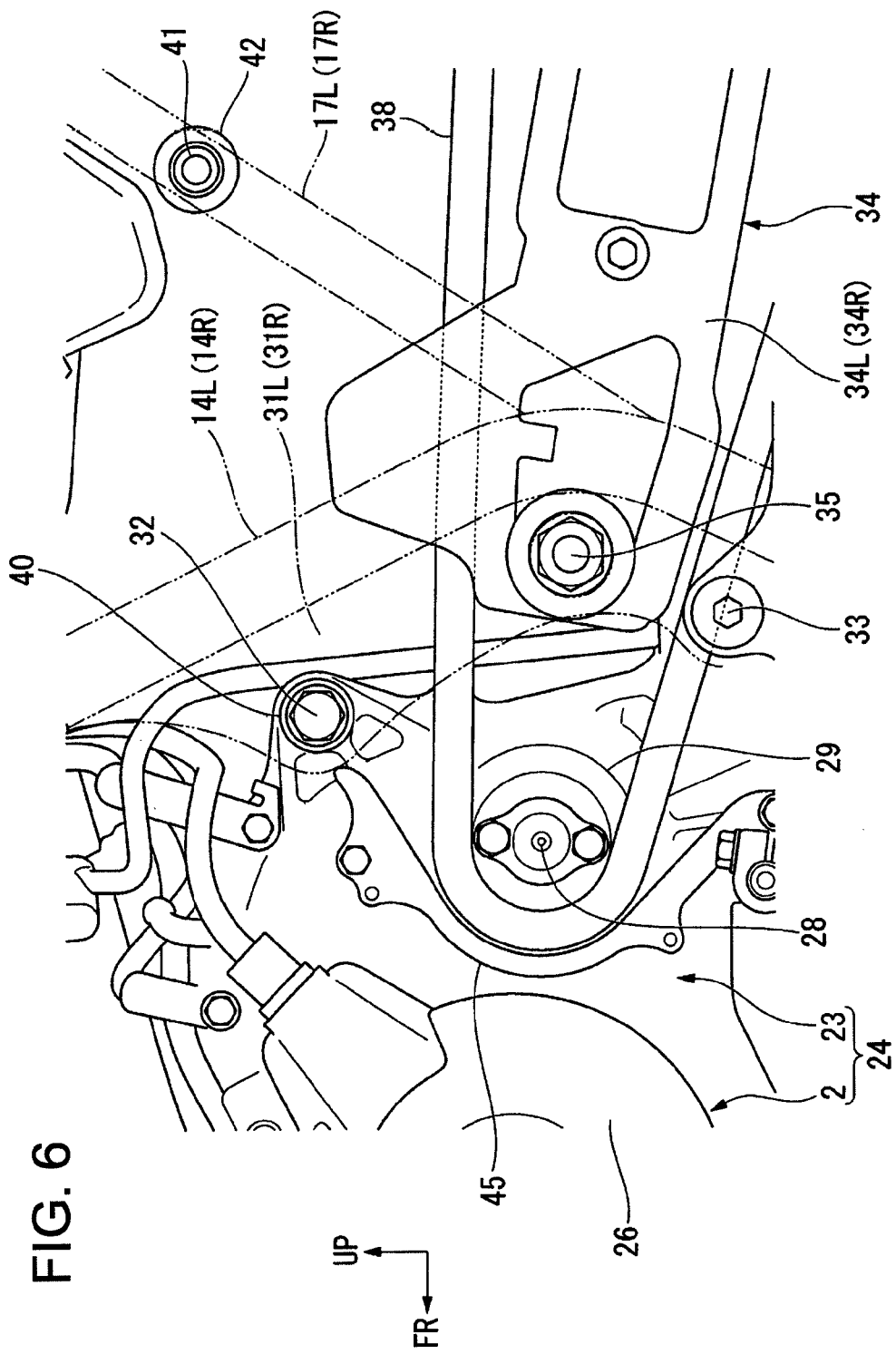
FIG. 6 is a view with the side covers and a portion of the frame member of FIG. 3 removed.

FIG. 3 shows a portion of the left side surface of the vehicle, with a central focus on the front end portion of the swing arm 34, and FIG. 4 is a view similar to FIG. 3, with the side covers 54a and 54b removed. Furthermore, FIG. 5 is a view of the same portion as in FIG. 3, viewed from obliquely left upward, and FIG. 6 is a view similar to FIG. 4, without the center pipe 14L and the support pipe 17L, and a cover 23a of the transmission 23 of the engine block 24.

As shown in these drawings, the front end of the swing arm 34 is disposed between the left and right center pipes 14L and 14R on almost the same level as joining portions between the left and right center pipes 14L and 14R and the support pipes 17L and 17R, and in that state turnably supported by the pivot shaft 35.

The upper and lower engine hanger bolts 32 and 33 for supporting a rear end of the engine block 24 on the pivot plates 31L and 31R are disposed at front upper and lower places, respectively, of the pivot shaft 35. Furthermore, the output shaft 28 and the drive sprocket 29 on the engine block 24 are disposed below the front of the upper engine hanger bolt 32. Also, the drive chain 38 extending between the drive sprocket 29 and the driven sprocket 37 passes through a space that is in between a left side surface of the engine block 24 and a right side surface of the left pivot plate 31L and below the upper engine hanger bolt 32.

Here, there is a clearance between the right side surface of the left pivot plate 31L and the left side surface of the engine block 24. Especially, as shown in FIG. 5, a boss portion 24a on the engine block 24 for inserting the upper engine hanger bolt 32 is spaced a larger distance away from the right side surface of the left pivot plate 31L. A metal collar 39 is installed between the boss portion 24a and the left pivot plate 31L, and in that state, the engine hanger bolt 32 is disposed inside the collar 39. In this manner, an upper track of the drive chain 38 is positioned below the location of the collar 39.

A plastic guide tube 40 for restricting excessive upward displacement of the drive chain 38 is rotatably mounted on an outer peripheral portion of the collar 39.

Figure 7:
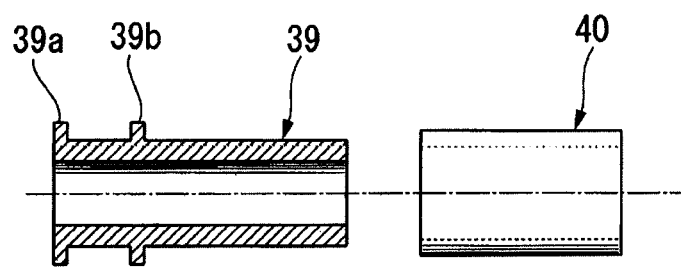
FIG. 7 is a partially-sectioned side view of components according to an embodiment of the present invention.

FIG. 7 illustrates a sectional view of the collar 39 and a side view of the guide tube 40.

As shown in FIG. 7, an end flange 39a, which abuts on an end surface of the boss portion 24a of the engine block 24, is formed around the periphery of one end of the collar 39. Also, a restricting flange 39b for restricting the axial displacement of the guide tube 40 is formed around the periphery of the collar 39 which is spaced a predetermined distance away from the end flange 39a. The guide tube 40 is slidably fitted, from the end of the collar 39 opposite from the end flange 39a, to an outer surface of a shaft portion of the collar 39. In this state, with the collar 39 locked between the engine block 24 and the left pivot plate 31L by the engine hanger bolt 32, the guide tube 40 is rotatably supported in a predetermined position on the engine hanger bolt 32. In this manner, the guide tube 40 supported by the engine hanger bolt 32 is positioned directly above the upper track of the drive chain 38.

Meanwhile, as shown in FIG. 6, a drive sprocket guide 45 having approximately the shape of an arc extending for approximately 180° of the periphery of the front of the drive sprocket 29 is provided in a protruding manner on a left side surface of the transmission 23 with the cover 23a removed. The drive sprocket guide 45 prevents the drive chain 38 from dropping off the drive sprocket 29 due to a deflection of the drive chain 38 on or in the vicinity of the drive sprocket 29 caused by a sudden change in tension of the drive chain 38, etc.

The upper engine hanger bolt 32, and the collar 39 and the guide tube 40 supported by the upper engine hanger bolt 32, are disposed on an imaginary line extending from an upper portion of the arc of the drive sprocket guide 45.

Furthermore, a support shaft 41 protruding inward in the vehicle width direction is provided at the position on the left support pipe 17L which is in a rearward and upward direction of the pivot shaft 35 and the upper engine hanger bolt 32 and almost directly below a lower end of the air cleaner 52. The support shaft 41 is fixed by welding or the like to the side surface of the support pipe 17L. The support shaft 41 is mounted with a rubber guide tube 42 (auxiliary guide member).

Figure 8:
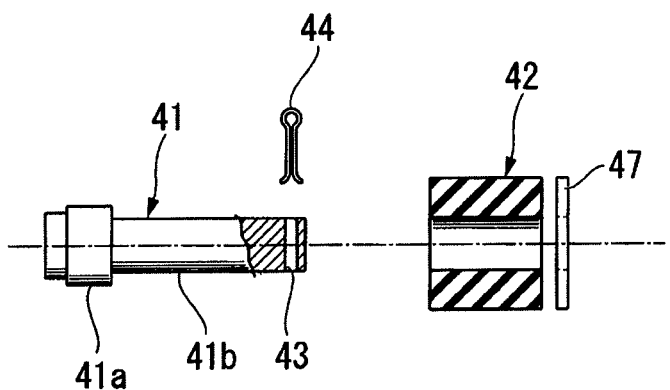
FIG. 8 is a partially-sectioned side view of other components according to an embodiment of the present invention.
Figure 9:
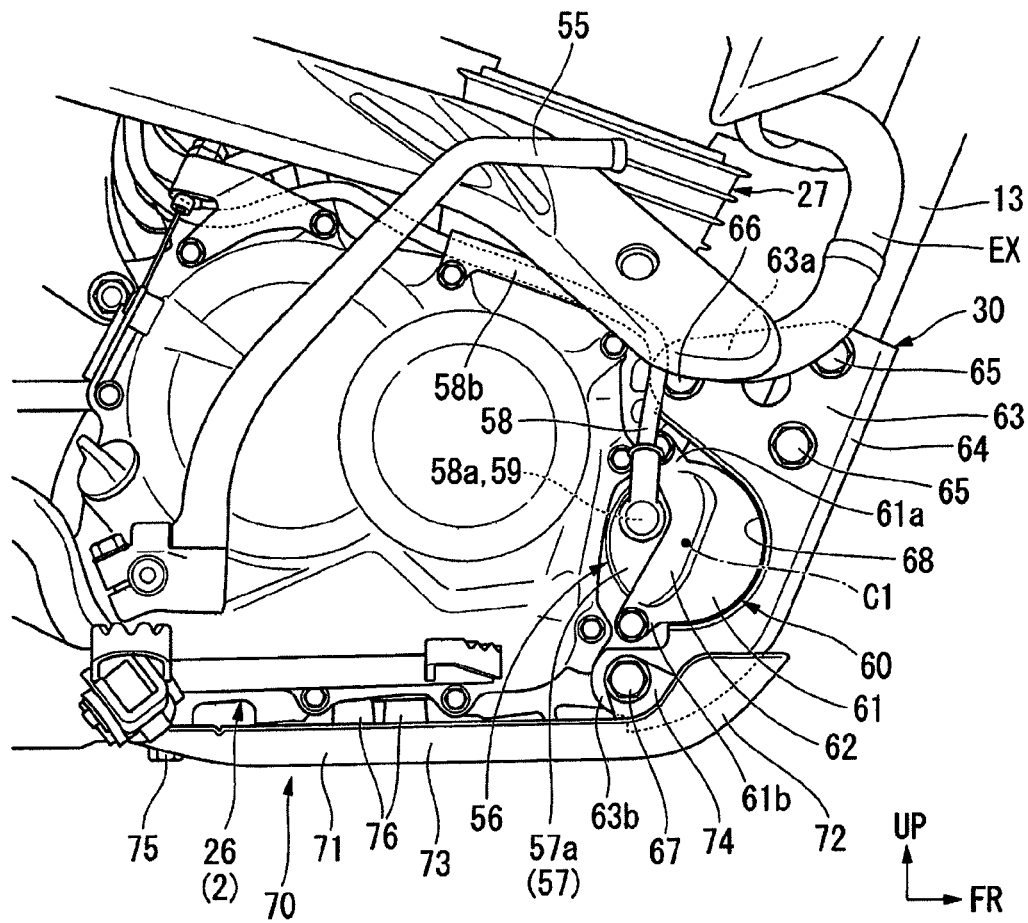
FIG. 9 is a right side view around a starter motor of an engine of the saddle-ride type vehicle.
Figure 10:
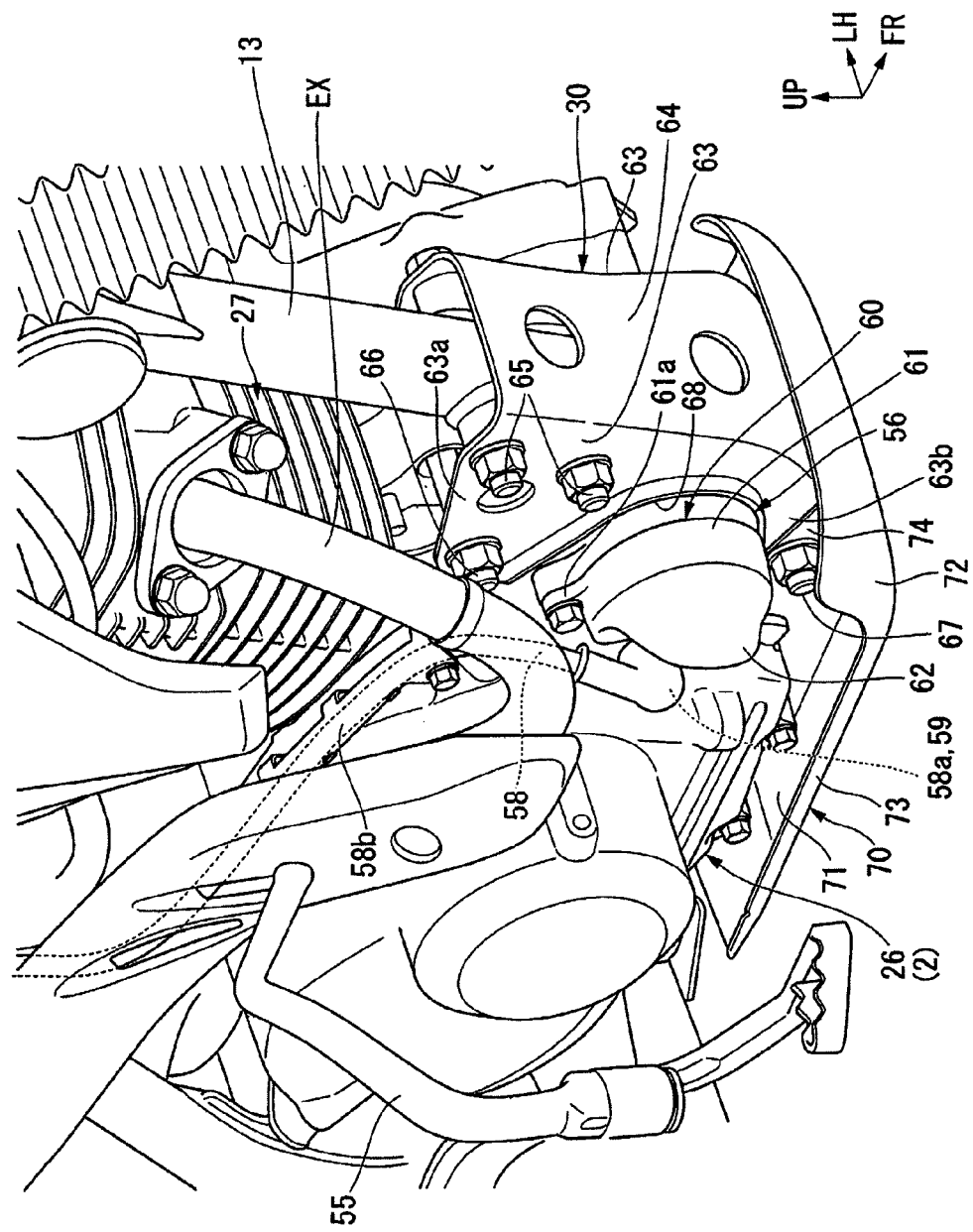
FIG. 10 is a perspective view around the starter motor as seen from above the right front side.
Figure 11:
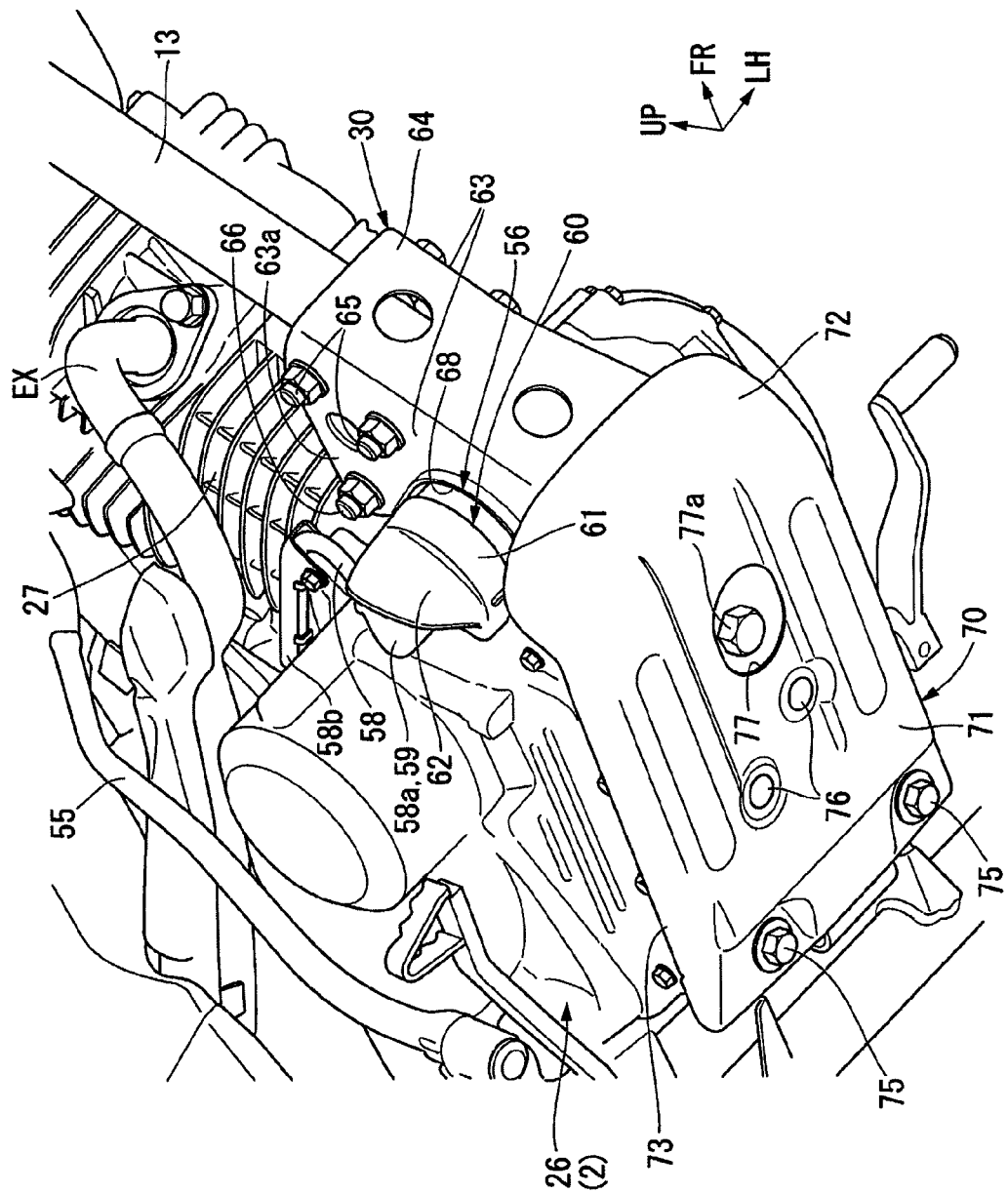
FIG. 11 is a perspective view around the starter motor as seen from below the right front side.
Figure 12:
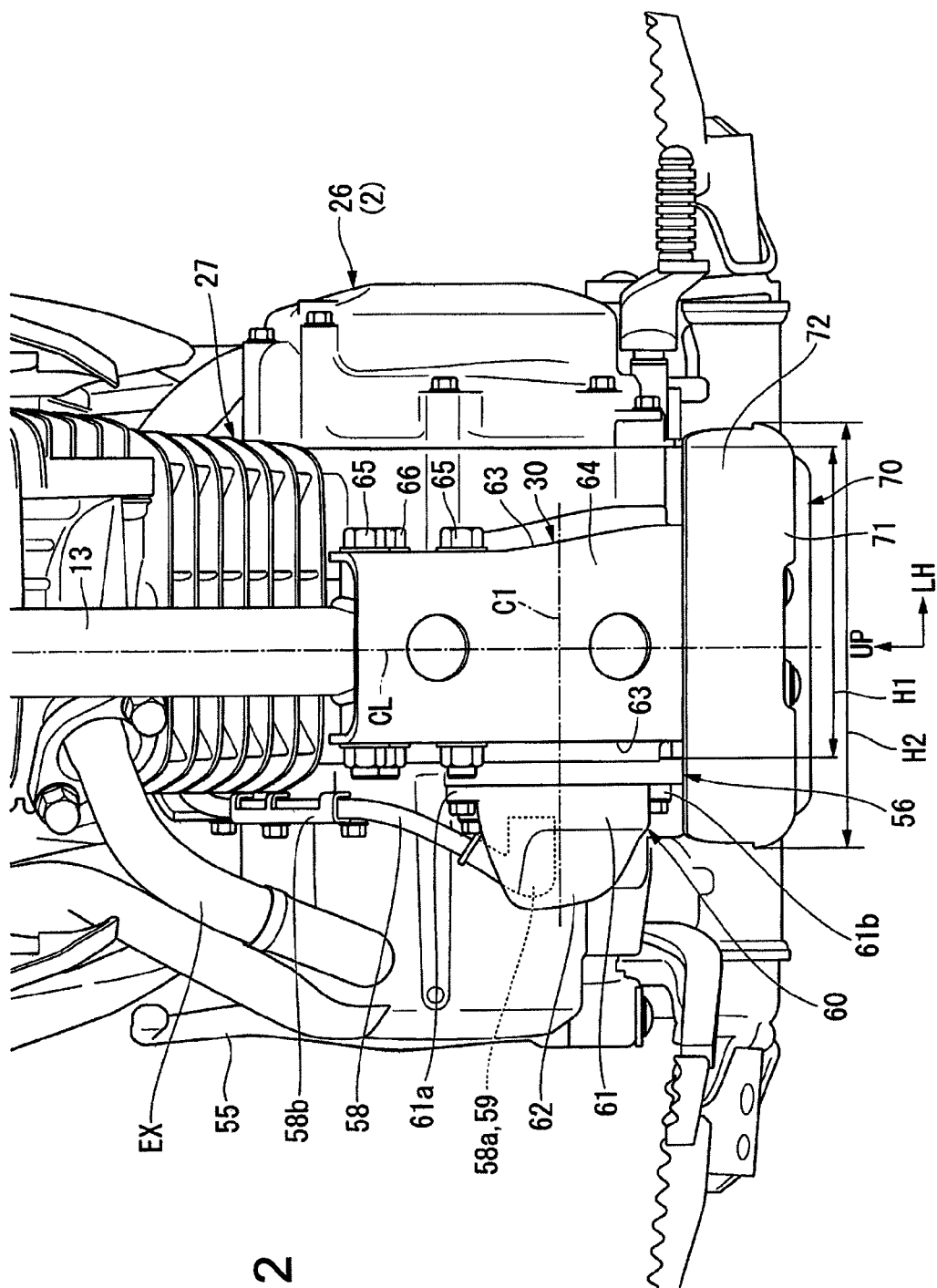
FIG. 12 is a front view around the starter motor.

FIG. 8 shows the support shaft 41 and components mounted thereto.

As shown in FIG. 8, the support shaft 41 is provided, at one axial end thereof (on the side thereof which is fixed to the support pipe 17L), with a large-diameter portion 41a. Also, a shaft portion 41b is provided in a protruding manner on the support shaft 41. The shaft portion 41b is continuous with the large-diameter portion 41a and has a diameter smaller than the large-diameter portion 41a. The cylindrical guide tube 42 is fitted, from a leading end of the shaft portion 41b, to the shaft portion 41b. In addition, the leading end of the shaft portion 41b has a pinhole 43 formed radially therethrough, the pinhole 43 being provided for insertion of a split pin 44 (retaining pin). It should be noted that a flat washer 47 is fitted to the shaft portion 41b after the guide tube 42 is fitted to the shaft portion 41b, and then the split pin 44 is inserted into the pinhole 43. Thus, the guide tube 42 is rotatable with respect to the shaft portion 41b while being prevented from dropping off the leading end of the shaft portion 41b.

In the motorcycle 1 constructed as above, when the swing arm 34 swings vertically due to a rough road or acceleration/deceleration during traveling of the motorcycle 1, the impact is absorbed by the cushion unit (not shown).

Furthermore, when a large variation in tension of the drive chain 38 occurs along with the above-described vertical swing of the swing arm 34, the drive chain 38 is likely to rise upwardly in response to the upward movement of the swing arm 34.

In the case of the motorcycle 1, at the front of the swing arm 34 which is closer to the on-vehicle equipment, the guide tube 40 is rotatably mounted to the engine hanger bolt 32 positioned directly above the upper track of the drive chain 38. Thus, when the drive chain 38 rises sharply at the front of the swing arm 34, the drive chain 38 abuts on the guide tube 40, thereby restricting further upward movement of the drive chain 38. In the motorcycle 1, therefore, the interference of the drive chain 38 with the on-vehicle equipment, such as the air cleaner 52, can be prevented.

Furthermore, in the motorcycle 1, the other guide tube 42 is rotatably installed below the air cleaner 52 in a rearward and upward direction of the upper engine hanger bolt 32. Therefore, even if the drive chain 38 rises upwardly below the air cleaner 52 at the large upstroke of the swing arm 34, the guide tube 42 receives the upward displacement of the drive chain 38, and thus the interference of the drive chain 38 with the air cleaner 52 can be prevented.

As described above, in the motorcycle 1, the cylindrical guide tube 40 for restricting upward displacement of the drive chain 38 is provided coaxially with the upper engine hanger bolt 32 that supports the engine block 24 in a rearward and upward direction of the drive sprocket 29. Therefore, with the guide tube 40 having a simple shape and easy to manufacture, the interference of the drive chain 38 with the on-vehicle equipment can be prevented. Consequently, the structure according to this embodiment allows the protection of the on-vehicle equipment and lower production costs.

Moreover, in this embodiment, the other guide tube 42 is provided in a rearward and upward direction of the guide tube 40, thereby allowing reliable prevention of the excessive displacement of the drive chain 38. Especially, in this embodiment, the guide tubes 40 and 42, which are respectively located at the front of and directly below the air cleaner 52, restrict the excessive upward displacement of the drive chain 38, and therefore, with a simple structure easy to manufacture, the interference of the drive chain 38 with the air cleaner 52 can be reliably prevented.

In this embodiment, after the guide tube 42 located to the rear is fitted to the support shaft 41 protruding on the left support pipe 17L, the split pin 44 prevents the dropping off of the guide tube 42. Thus, the guide tube 42 can be mounted only by the component that is easy to manufacture, and production costs can be further reduced.

Furthermore, in this embodiment, the guide tube 42 supported by the support shaft 41 of the support pipe 17L is disposed in a rearward and upward direction of the guide tube 40 supported by the engine hanger bolt 32. Thus, the excessive displacement of the drive chain 38 can be restricted without causing a sudden increase in swing resistance of the swing arm 34 even when the drive chain 38 is displaced largely upward along with the swing arm 34.

Additionally, in this embodiment, the arc-shaped drive sprocket guide 45 is provided in a protruding manner on the left side surface of the engine block 24 so as to cover the front peripheral area of the drive sprocket 29, and the guide tube 40 located to the front is disposed on an imaginary line extending from the upper portion of the arc of the drive sprocket guide 45. Thus, the drive chain 38 returning from the driven sprocket 37 can be smoothly guided to the drive sprocket 29, so that the drive of the rear wheel WR through the drive chain 38 can be constantly smoothened.

It should be noted that the present invention is not limited to the aforementioned embodiment and various changes in design can be made without departing from the gist of the invention.

Here, a starter motor 56 and the like of the engine 2 of the motorcycle will be described with reference to FIGS. 9 to 12.

The starter motor 56 for starting the engine 2 is disposed just in front of a front end of the crankcase 26. The starter motor 56 has a well-known structure in which an armature, a yoke and the like are disposed within a cylindrical casing 57, with a central axis C1 of the casing 57 along the horizontal direction. A drive shaft (not shown) protrudes from a left end of the casing 57, and the left end of the casing including the drive shaft is held in a motor holder (not shown) that is provided in a protruding manner on a front wall portion of the crankcase 26. In the drawing, reference sign EX denotes an exhaust pipe that is bent in front of a cylinder head and extends rearward while passing on the right of the cylinder block 27, and reference sign 55 denotes a kick arm for starting the engine 2, the kick arm being in retracted position.

A terminal 59 for fixing a terminal 58a of a feeding harness 58 is provided in a protruding manner at a right end of the casing 57. The terminal 58a and the terminal 59 are each mounted with a rubber cap. The terminal 58a and the terminal 59 are disposed in the upper rear of the right end of the casing 57. The feeding harness 58 extends upwardly and obliquely inward in the vehicle width direction of the terminal 59 and then is curved in a rearward and upward direction to extend rearward along an upper surface inclined upwardly toward the rear on the right side of the crankcase 26. The feeding harness 58, as appropriate, joins a main harness or the like above the rear of the crankcase 26 and is routed along the body frame F. A bracket 58b for holding the feeding harness 58 is fixed to a portion of the upper surface on the right side of the crankcase 26 which is located to the right of the cylinder block 27.

A cover member 60 for preventing the starter motor 56, the feeding harness 58, and the terminal 59 from being subjected to disturbance is mounted to the right end of the casing 57. The cover member 60 has a base portion 61 that covers and fits the front of the right end of the casing 57, and a vertical wall portion 62 that rises rightward from the base portion 61. The cover member 60 is an integrally-molded product which is made of, for example, synthetic resin. Upper and lower fastening members 61a and 61b to be fastened to upper and lower portions, respectively, of the right end of the casing 57 are formed at upper and lower ends of the base portion 61.

The bracket 30 located at the bottom of the down pipe 13 has left and right side wall portions 63 and a front wall portion 64. Upper portions of each of the left and right side wall portions 63 are fastened to lower ends of the down pipe 13 by upper and lower fastening bolts 65. An upper hanger plate 63a for supporting an upper portion of the front end of the crankcase 26 with an engine hanger bolt 66 extends from an upper portion of each of the left and right side wall portions 63. A lower hanger plate 63b for supporting a lower portion of the front end of the crankcase 26 with an engine hanger bolt 67 extends from a lower portion of each of the left and right side wall portions 63. Between the upper and lower hanger plates 63a and 63b of the right side wall portion 63, a recess 68 is formed by cutting out the right side wall portion 63 arcuately along the right-hand outer periphery of the starter motor 56. Also between the upper and lower hanger plates 63a and 63b of the left side wall portion 63, a recess is formed by cutting the left side wall portion 63 as appropriate so as to correspond to the motor holder.

A skid plate 70 for covering a substantially horizontal lower surface of the crankcase 26 is disposed directly below the crankcase 26. The skid plate 70 has a substantially horizontal flat portion 71 that faces the lower surface of the crankcase 26, an upwardly curved portion 72 that extends forwardly and upwardly from a front end of the flat portion 71, and a rib portion 73 that is continuous with edge portions on both sides of the flat portion 71 and the upwardly curved portion 72. The skid plate 70 is in one piece formed of steel sheet, aluminum alloy sheet, synthetic resin or the like.

Left and right mount stays 74 are fixedly provided on the upper side of a front portion of the skid plate 70. Each of the left and right mount stays 74 is placed in superposed relation with the outer surface of the lower hanger plate 63*b* of the bracket 30 and fastened together by the engine hanger bolt 67. A rear end of the skid plate 70 is fastened to a rear end of the lower surface of the crankcase 26 from below by left and right fastening bolts 75. In the drawing, reference sign 76 denotes elastic members that are mounted on longitudinally intermediate portions of the skid plate 70 and configured to abut on lower surfaces of the crankcase 26, and reference sign 77 denotes a working hole that is located forwardly with respect to both elastic members to cause a drain bolt 77*a* located at the bottom of the crankcase 26 to be exposed from the lower side.

A full horizontal width H2 of the skid plate 70 is set wider than a full horizontal width H1 of a main body without the left and right covers of the crankcase 26. The main body of the crankcase 26 is disposed so as to be displaced leftward due to consideration of the weight balance of the engine 2, etc., and therefore the skid plate 70 is also disposed so as to be displaced leftward. In the drawing, reference sign CL denotes a vehicle left-right center line. While a right end of the skid plate 70 covers from below a right end of the starter motor 56 (and the base portion 61 of the cover member 60) located above the upwardly curved portion 72, the terminal 59 and the feeding harness 58 protrude rightward beyond the right end of the skid plate 70. The vertical wall portion 62 of the cover member 60 is provided in a manner protruding rightward beyond the right end of the skid plate 70 so as to cover the terminal 59 and the feeding harness 58 from the front and below.

REFERENCE SIGNS LIST

1 . . . Motorcycle
2 . . . Engine
11 . . . Head pipe
12 . . . Main frame pipe
14L, 14R . . . Center pipe
16L, 16R . . . Seat rail
17L, 17R . . . Support pipe
24 . . . Engine block
29 . . . Drive sprocket
32 . . . Engine hanger bolt
34 . . . Swing arm
37 . . . Driven sprocket
38 . . . Drive chain
40 . . . Guide tube
41 . . . Support shaft (shaft)
42 . . . Guide tube (auxiliary guide member)
44 . . . Split pin (retaining pin)
45 . . . Drive sprocket guide
52 . . . Air cleaner (on-vehicle equipment)
F . . . Body frame
WR . . . Rear wheel

What is claimed is:

1. A chain drive for a saddle-ride type vehicle comprising:
a drive sprocket that is mounted to an output shaft of an engine block;
a swing arm that has front and rear portions, the front portion of the swing arm being swingably supported by a body frame in the vicinity of the drive sprocket, and the rear portion of the swing arm journaling a rear wheel;
a driven sprocket that is mounted to an axle of the rear wheel;
a drive chain that extends between the drive sprocket and the driven sprocket;
an engine hanger bolt that is located in a direction rearwardly in a vehicle-body longitudinal direction and upwardly of the drive sprocket and extends in a vehicle width direction across the drive sprocket, the engine hanger bolt fixing the engine block to the body frame; and
a cylindrical guide tube that is mounted coaxially with the engine hanger bolt, the guide tube restricting displacement of the drive chain toward on-vehicle equipment located above the drive chain.

2. The chain drive for the saddle-ride type vehicle according to claim 1, further comprising an auxiliary guide member at a position spaced rearwardly in the vehicle-body longitudinal direction of the guide tube, the auxiliary guide member restricting upward displacement of the drive chain.

3. The chain drive for the saddle-ride type vehicle according to claim 2, wherein the auxiliary guide member has a cylindrical shape and is fixed to a shaft protruding from the body frame by a retaining pin.

4. A chain drive for a saddle-ride type vehicle comprising:
a body frame that has: a head pipe; a main frame pipe extending rearward from the head pipe; left and right center pipes extending downward from a rear portion of the main frame pipe; left and right seat rails extending rearward from a rear portion of the main frame pipe; and left and right support pipes each coupling together a lower area of the center pipes and a rear area of the seat rails;
an air cleaner that is installed in a space surrounded by the center pipes, the seat rails, and the support pipes in side view, the air cleaner filtering air drawn into an engine;
a drive sprocket that is mounted to an output shaft of an engine block;
a swing arm that has front and rear portions, the front portion of the swing arm being disposed between the left and right center pipes and swingably supported by the left and right center pipes, and the rear portion of the swing arm journaling a rear wheel;
a driven sprocket that is mounted to an axle of the rear wheel;
a drive chain that extends between the drive sprocket and the driven sprocket, the drive chain having a front portion, the front portion of the drive chain being disposed between the left and right center pipes along with the swing arm;
an engine hanger bolt that is located in a direction rearwardly, in a vehicle-body longitudinal direction, and upwardly of the drive sprocket and extends in a vehicle width direction across the drive sprocket, the engine hanger bolt fixing the engine block to the left and right center pipes;
a cylindrical guide tube that is located between one of the left and right center pipes and the engine block and mounted coaxially with the engine hanger bolt, the guide tube restricting displacement of the drive chain toward the air cleaner; and
an auxiliary guide member that is mounted to a shaft, the shaft being located below the air cleaner and protruding inwardly in the vehicle width direction from one of the left and right support pipes, the auxiliary guide member restricting displacement of the drive chain toward the air cleaner.

5. The chain drive for the saddle-ride type vehicle according to claim 4, wherein the auxiliary guide member is disposed rearwardly and upwardly relative to the guide tube.

6. The chain drive for the saddle-ride type vehicle according to claim 5, further comprising a drive sprocket guide, the drive sprocket guide having approximately the shape of an arc and disposed forward of the drive sprocket so as to partially surround an outer surface of the drive sprocket, wherein the guide tube is disposed on an imaginary line extending from the arc of the drive sprocket guide.

7. The chain drive for the saddle-ride type vehicle according to claim 4, further comprising a drive sprocket guide, the drive sprocket guide having approximately the shape of an arc and disposed forward of the drive sprocket so as to partially surround an outer surface of the drive sprocket,
wherein the guide tube is disposed on an imaginary line extending from the arc of the drive sprocket guide.

\* \* \* \* \*